G. Gunther.
Bird Cage.
No. 85,523. Patented Jan. 5, 1869.
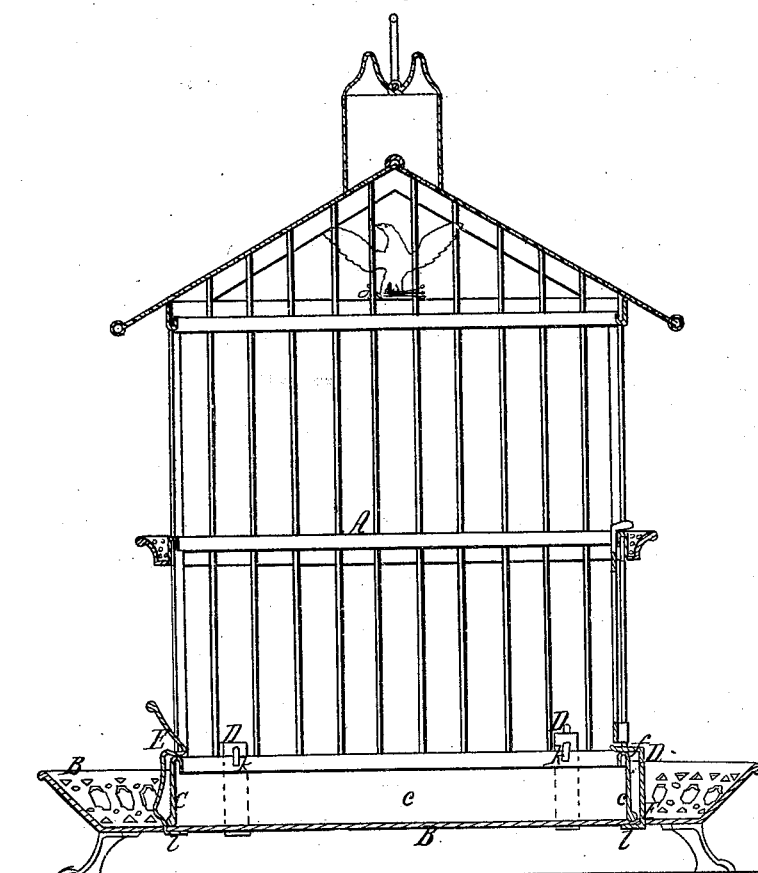
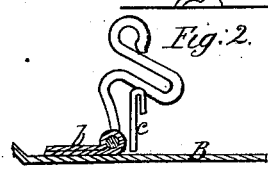
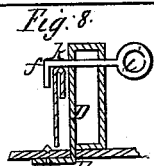
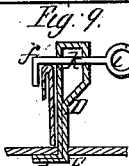
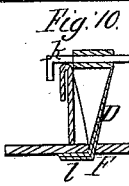
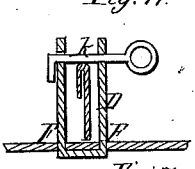
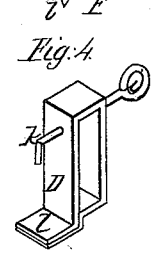
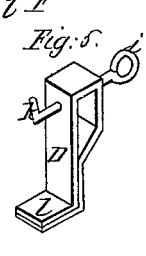
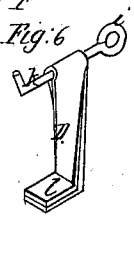
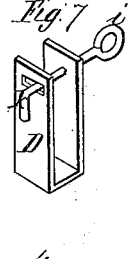
Witnesses:
R. Boekler
J. Bernord
Inventor:
Gottlob Gunther

GOTTLOB GÜNTHER, OF NEW YORK, N. Y.

Letters Patent No. 85,523, dated January 5, 1869.

IMPROVED BIRD-CAGE.

The Schedule referred to in these Letters Patent and making part of the same.

*To all whom it may concern:*

Be it known that I, GOTTLOB GÜNTHER, of the city, county, and State of New York, have made certain new and useful Improvements in the Construction of "Bird-Cages;" and I do hereby declare that the following is a full, clear, and exact description of the same, reference being had to the accompanying drawings, making part of this specification, in which—

Figure 1 represents a vertical central section of a complete cage with my improvements;

Figure 2 represents a detached vertical section of the ordinary hook employed for securing the cage to its bottom;

Figure 3 is a perspective view of the improved fixed hook used for fastening the cage to its bottom;

Figures 4, 5, 6, and 7, a remodifications of the same shown in perspective; and

Figures 8, 9, 10, and 11, are vertical sections of the same.

Similar letters of reference indicate corresponding parts in the several figures.

One of the more important features in the construction of bird-cages is the means used for fastening the cage to its bottom, and this is the feature to which my invention more particularly relates.

The ordinary device which is used very generally for this purpose, is a hook, which is allowed to swing in a hinge, *b*, secured to the top side of the cage-bottom so as to pass the hook over the top edge of the bottom bar *c* of the cage, and thereby securing the cage to its bottom, clearly shown in fig. 2.

This manner of securing the cage is rather laborious and slow, and the device, of little durability, soon becomes useless on account of the hook being liable to be bent out of its proper shape, in packing and transporting, on account of the hook becoming oxidized and immovable in its hinge, caused by the moisture settling therein from waste water, and from cleaning the cage, and on account of the close position of the hinge to the bottom; and frequently after the hook becomes fixed in its hinge, the same is, in trying to work it, broken, or its hinge detached from the bottom, it being solely dependent upon the simple soldering of it, and the hook, when it becomes fixed, serving as a lever to force the hinge off the bottom.

The object of my improvements is to have such fastening of the cage to its bottom, that the same is rendered self-closing; that the same is less subject to oxidation, to become inoperative; that the same is more durable, and stronger, than with the devices heretofore known or used for securing the cage to its bottom.

To enable others skilled in the art to make and use my invention, I will proceed to describe its construction and operation.

A, in the drawing, fig. 1, represents the cage, which is constructed in the ordinary way with a bottom bar, *c*, which is the termination of its lower part.

B represents the cage-bottom, which is also constructed in the usual way to correspond with the shape or pattern of the cage for which it is fitted and used.

Along the rear side of the cage, and according to the pattern of cage used, along both sides, I employ one, two, or more stationary or fixed hooks, D D, and on its front the spring-hook or hooks E, which all are made to overlap the bottom bar of the cage, to hold the cage to its bottom.

The spring-hook is made so that it can be withdrawn, or that, in placing the cage upon its bottom, the same may be, by pressing the cage to its place, forced back and drop over the bottom bar after being properly down upon its bottom.

The stationary hooks may be constructed in the form as shown in fig. 1, with the fixed lip *f* to overlap the bottom bar, or as, in using the same upon certain different patterns of cages, it is preferable to use the said hook with a movable lip or with a sliding wire, *k*, in its top part, so that it may be withdrawn, as clearly shown in figs. 4, 5, 6, and 7, provided with an eye to serve as a handle, *i*, to it.

Now, instead of securing the hooks in the ordinary manner of soldering them to the top part of the cage-bottom, I provide the bottom with a proper slot, F, through which the lower part of the hook is passed, and turn the lower end *l* of the hook under the bottom of the cage, so as to have a shoulder, preventing the withdrawal of the hook. I then solder or rivet, or rivet and solder this lower end of the hook firmly with the bottom of the cage. By this means of securing the hook on the under side of the cage-bottom, the same is more firmly and more durably combined with the bottom, without depending upon the sole soldering, as has heretofore been done.

Instead of constructing a single hook, to pass only on one side of the bottom bar, the same may be made double, and pass on both sides of the bottom bar, and the bottom provided accordingly with two slots through which it passes, as clearly shown in figs. 7 and 11, whereby the hook is constructed of additional strength, and suitable for strong catches.

From the foregoing it will be seen that by the use of the device herein shown, detaching and attaching of the cage to its bottom may be very readily performed; that the hooks constructed and combined in the mode shown are less liable to become unserviceable by oxidation, and that they are made stronger and more durable than those heretofore used.

I am well aware that wires for handles to lift covers from pails are secured by a strap of tin, the ends of which are passed through a slot in the cover to the opposite side, and then spread apart, and either soldered or riveted upon the under side of the cover, and this I do not claim as my invention.

What I do claim, and desire to secure by Letters Patent, is—

1. A fastening for a bird-cage, composed of a metallic standard, the end of which passes through a slot in the bottom of the cage, and is there turned underneath the bottom, and soldered or riveted, so as to aid in sustaining the weight of the cage, and to present no joint upon the upper surface, all as and for the purpose specified.

2. In combination with such a standard, the fastening pins shown, all as and for the purpose herein stated.

3. A stand, thus arranged, when composed of two uprights passing between the bottom bar of the cage, passes, as and for the purpose set forth.

4. A standard constructed, when its upper part forms a spring-hook, substantially as and for the purpose herein described.

GOTTLOB GÜNTHER.

Witnesses:
MATTHEW DALY,
ERNEST REICHTER.